US010333133B2

(12) United States Patent
Park et al.

(10) Patent No.: US 10,333,133 B2
(45) Date of Patent: Jun. 25, 2019

(54) CAP ASSEMBLY FOR SECONDARY BATTERY AND SECONDARY BATTERY INCLUDING THE SAME (71) Applicant: Samsung SDI Co., Ltd., Yongin-si, Gyeonggi-do (KR)

(72) Inventors: Gun Gue Park, Yongin-si (KR); Hyo Rim Bak, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 64 days.

(21) Appl. No.: 15/398,360

(22) Filed: Jan. 4, 2017

(65) Prior Publication Data
US 2017/0207439 A1 Jul. 20, 2017

(30) Foreign Application Priority Data
Jan. 20, 2016 (KR) .................. 10-2016-0007051

(51) Int. Cl.
| H01M 2/00 | (2006.01) |
| H01M 2/34 | (2006.01) |
| H01M 2/12 | (2006.01) |
| H01M 2/04 | (2006.01) |

(52) U.S. Cl.
CPC .......... *H01M 2/345* (2013.01); *H01M 2/046* (2013.01); *H01M 2/1229* (2013.01); *H01M 2/1241* (2013.01); *H01M 2/0413* (2013.01); *H01M 2200/20* (2013.01)

(58) Field of Classification Search
CPC ............... H01M 2/1241; H01M 2/345; H01M 2200/20; H01M 2/0413; H01M 2/046
See application file for complete search history.

(56) References Cited

U.S. PATENT DOCUMENTS

| 4,147,841 A * | 4/1979 | Shroff .................. H01M 2/127 429/86 |
| 2007/0154781 A1 * | 7/2007 | Choi .................. H01M 2/0413 429/53 |
| 2009/0233160 A1 | 9/2009 | Kim |

(Continued)

FOREIGN PATENT DOCUMENTS

| EP | 0364995 A2 | 4/1990 |
| KR | 2000-0061604 | 10/2000 |

(Continued)

OTHER PUBLICATIONS

EPO Extended Search Report dated Mar. 20, 2017, for corresponding European Patent Application No. 17152376.4 (8 pages).

*Primary Examiner* — Cynthia H Kelly
*Assistant Examiner* — Monique M Wills
(74) *Attorney, Agent, or Firm* — Lewis Roca Rothgerber Christie LLP (57) ABSTRACT

A cap assembly for a secondary battery includes: a cap plate; a current interrupt device (CID); a middle plate; and an insulator. The CID includes: a vent plate under the cap plate and including a vent portion protruding downward; and a sub-plate under the vent plate and connected to the vent portion. The middle plate is between the vent plate and the sub-plate and is electrically connected to the vent plate via the sub-plate. The insulator is between the vent plate and the middle plate, and the insulator includes a crosslinked polymer.

7 Claims, 8 Drawing Sheets (56) References Cited

U.S. PATENT DOCUMENTS

2010/0209749 A1* 8/2010 Okada ................ H01M 2/0242
                                                       429/94
2010/0330415 A1   12/2010 Park
2015/0194644 A1*  7/2015 Jung .................. H01M 2/0413
                                                       429/56
2015/0287965 A1   10/2015 Kim et al.

FOREIGN PATENT DOCUMENTS

| KR | 10-2011-0000994 | 1/2011 |
| KR | 10-2015-0035267 | 4/2015 |

* cited by examiner

CAP ASSEMBLY FOR SECONDARY BATTERY AND SECONDARY BATTERY INCLUDING THE SAME

CROSS-REFERENCE TO RELATED APPLICATION

This application claims priority to and the benefit of Korean Patent Application No. 10-2016-0007051, filed on Jan. 20, 2016 in the Korean Intellectual Property Office, the disclosure of which is incorporated herein in its entirety by reference.

BACKGROUND

1. Field

Aspects of embodiments of the present invention relate to a cap assembly for a secondary battery and a secondary battery including the same.

2. Description of the Related Art

Secondary batteries are rechargeable and, thus, may be repeatedly used as energy sources of, for example, portable electronic devices, electric tools, gardening tools, electric vehicles (EVs), electric power storage systems, etc.

Generally, cylindrical secondary batteries are used in such applications, and current interrupt devices (CIDs) are provided in such cylindrical secondary batteries to ensure safe operation of the cylindrical secondary batteries.

CIDs are protection devices for preventing explosions caused by high internal pressure situations arising in secondary batteries. When the internal pressure of a secondary battery increases, the CID interrupts current (e.g., current flow) between an electrode assembly and a cap assembly of the secondary battery to stop charging/discharging of the secondary battery.

However, if an insulator of such a CID melts due to generated heat, for example, in a short-circuit situation, the current may not be interrupted by the CID.

For example, when a positive electrode plate and a negative electrode plate of a secondary battery are short-circuited, an abnormal situation may arise due to heat (e.g., joule heat) caused by a short-circuit current, and if an insulator of a CID of the secondary battery melts due to the heat, the current flowing from the electrode assembly to the cap assembly may not be interrupted. As a result, the secondary battery may be overcharged and may catch fire and/or explode.

SUMMARY

Aspects of embodiments of the present invention include a cap assembly for a secondary battery, the cap assembly being configured to stably maintain the performance of a current interrupt device (CID) even when heat is generated in the secondary battery due to a short circuit or the like.

Additional aspects of the present invention will be set forth, in part, in the description that follows and, in part, will be apparent from the description or may be learned by practice of the presented embodiments.

According to one embodiment, a cap assembly for a secondary battery includes: a cap plate; a current interrupt device (CID); a middle plate; and an insulator. The CID includes: a vent plate under the cap plate and including a vent portion protruding downward; and a sub-plate under the vent plate and connected to the vent portion. The vent plate is configured to deform in response to an increase in an internal pressure of the secondary battery. The middle plate is between the vent plate and the sub-plate and is electrically connected to the vent plate via the sub-plate. The insulator is between the vent plate and the middle plate, and the insulator includes a crosslinked polymer.

The insulator may include a crosslinked polypropylene (PP) resin.

The insulator may include a crosslinked polyethylene (PE) resin.

The insulator may be cross-linked by performing a water cross-linking process after an injection molding process.

The insulator may have a circular ring shape having a central opening, and an anti-deformation rib may extend along an outer periphery of the circular ring shape of the insulator and may protrude downward.

The anti-deformation rib may have a downwardly-decreasing thickness.

The anti-deformation rib may have an inner side and an outer side, and the outer side of the anti-deformation rib may be tapered.

The insulator may include a plurality of protrusions protruding from an inner side of the circular ring shape of the insulator toward a center of the insulator along an inner periphery of the inner side.

The vent plate may have an S-shaped bent structure including a lower bent portion and an upper bent portion, and the vent plate may be interference fitted into the circular ring shape of the insulator. The plurality of protrusions may engage an upper portion of the lower bent portion to couple the vent plate to the insulator.

The middle plate and the insulator may respectively include penetration openings in center regions thereof, and the vent portion may be directly connected to a center region of the sub-plate through the penetration opening of the insulator and the penetration opening of the middle plate.

According to another embodiment of the present invention, a secondary battery includes: a can having an opening; an electrode assembly in the can; and a cap assembly sealing the opening of the can and electrically connected to the electrode assembly. The cap assembly includes: a cap plate; a current interrupt device (CID); a middle plate; and an insulator between the vent plate and the middle plate. The CID includes: a vent plate under the cap plate and including a vent portion protruding downward; and a sub-plate under the vent plate and connected to the vent portion. The vent plate is configured to deform in response to an increase in an internal pressure of the can. The middle plate is between the vent plate and the sub-plate and is electrically connected to the vent plate via the sub-plate. The insulator is between the vent plate and the middle plate, and the insulator includes a crosslinked polymer.

According to embodiments of the present invention, a secondary battery includes a cap assembly that is configured to stably maintain the performance of a current interrupt device (CID) even when heat is generated in the secondary battery.

BRIEF DESCRIPTION OF THE DRAWINGS

These and/or other aspects of the present invention will become apparent and more readily appreciated from the following description of exemplary embodiments thereof, taken in conjunction with the accompanying drawings, in which.

DETAILED DESCRIPTION

Reference will now be made in detail to exemplary embodiments that are illustrated in the accompanying drawings, in which like reference numerals refer to like elements throughout. In this regard, the described embodiments may have different forms and should not be construed as being limited to the descriptions set forth herein. Accordingly, exemplary embodiments are merely described below, by referring to the figures, to explain aspects of the present invention.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Figure 1:
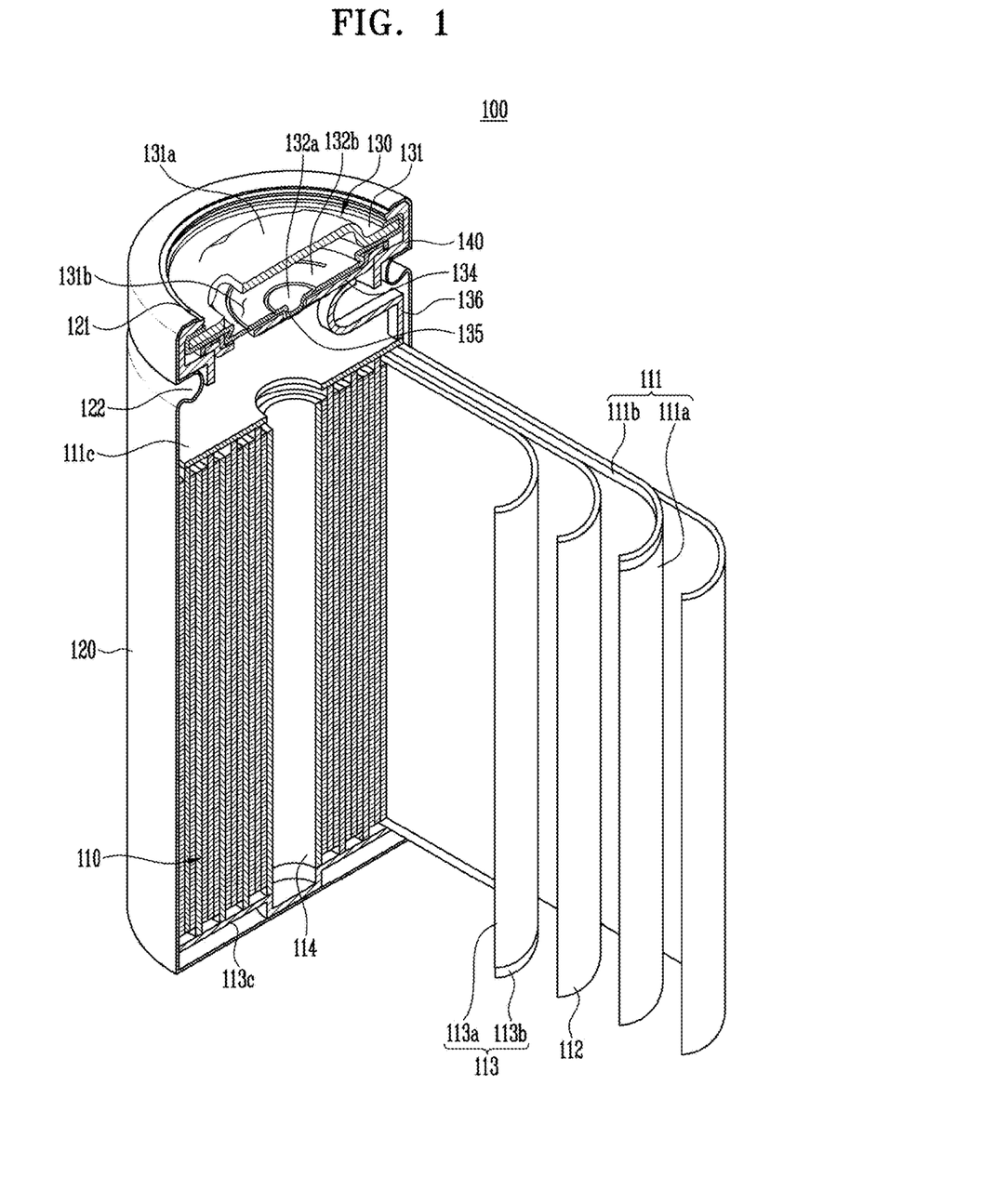
FIG. 1 is a cut-away view of a secondary battery according to an embodiment of the present invention.

FIG. 1 is a cut-away view of a secondary battery 100 according to an embodiment of the present invention.

Referring to FIG. 1, the secondary battery 100 includes an electrode assembly 110 configured to generate (and store) current, a can 120 accommodating the electrode assembly 110, and a cap assembly 130 coupled to the can 120 and electrically connected to the electrode assembly 110.

The electrode assembly 110 includes a positive electrode plate 111, a negative electrode plate 113, and a separator 112. The separator 112 is between the positive electrode plate 111 and the negative electrode plate 113. The positive electrode plate 111, the separator 112, and the negative electrode plate 113 may be sequentially stacked and wound in the form of a jelly roll. The electrode assembly 110 may have a cylindrical shape, and a center pin 114 may be placed in a center portion of the electrode assembly 110 to maintain the cylindrical shape of the electrode assembly 110.

The positive electrode plate 111 includes a current collector including metallic foil having a coated portion 111a, on which an active material is applied, and a non-coated portion 111b, on which an active material is not applied. The negative electrode plate 113 includes a current collector including metallic foil having a coated portion 113a, on which an active material is applied, and a non-coated portion 113b, on which an active material is not applied. A positive current collecting plate 111c is connected to the non-coated portion 111b of the positive electrode plate 111, and a negative current collecting plate 113c is connected to the non-coated portion 113b of the negative electrode plate 113.

The can 120 is a cylindrical barrel having an opening at an end thereof and a space for accommodating the electrode assembly 110. The negative current collecting plate 113c may be welded to a bottom surface of the can 120, and thus, the can 120 may function as a negative electrode terminal. The can 120 may include stainless steel, aluminum, or an equivalent thereof; however, the can 120 is not limited thereto.

The cap assembly 130 is coupled to the opening of the can 120 with a gasket 140 being disposed therebetween to seal the can 120 (e.g., to seal the electrode assembly 110 and an electrolyte in the can 120). In addition, the cap assembly 130 includes a current interrupt device (CID) and is electrically connected to the electrode assembly 110.

Figure 2:
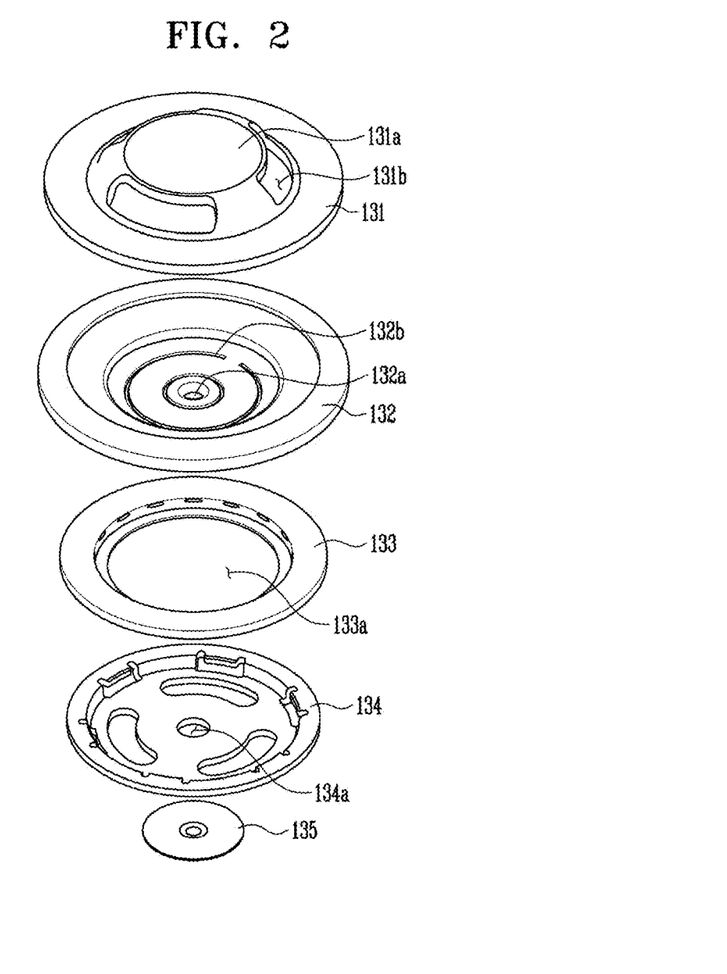
FIG. 2 is an exploded perspective view of a cap assembly shown in FIG. 1.
Figure 3:
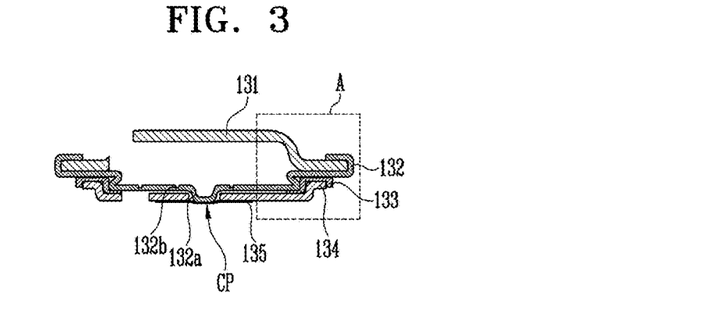
FIG. 3 is a cross-sectional view of the cap assembly shown in FIGS. 1 and 2.

FIG. 2 is an exploded perspective view of the cap assembly 130 shown in FIG. 1, and FIG. 3 is a cross-sectional view of the cap assembly 130.

Referring to FIGS. 2 and 3, the cap assembly 130 includes a cap plate 131, a vent plate 132, an insulator 133, a middle plate 134, and a sub-plate 135. The CID is substantially formed by (e.g., includes) the vent plate 132 and the sub-plate 135, and the vent plate 132 and the sub-plate 135 are connected to each other (e.g., directly contact each other) at a connection portion CP therebetween. The connection portion CP may be a welded portion.

The cap plate 131 is connected to the positive current collecting plate 111c and functions as a positive electrode terminal of the secondary battery 100. The cap plate 131 includes a terminal 131a protruding outward and ventilation openings 131b (e.g., ventilation holes).

The vent plate 132 is positioned under the cap plate 131 and surrounds an edge portion (e.g., an outer periphery) of the cap plate 131. The vent plate 132 forms an upper portion of the CID and is electrically connected to the sub-plate 135, which forms a lower portion of the CID, through the connection portion CP.

The vent plate 132 deforms (e.g., is configured to deform) when the internal pressure of the secondary battery 100 increases (e.g., increases beyond a certain value). For example, if the internal pressure of the secondary battery 100 increases due to gas generated by the electrode assembly 110 in a situation, such as an overcharging situation, the shape of the vent plate 132 is reverted (or inverted) upward and the vent plate 132 is separated from the sub-plate 135, as further described later, thereby interrupting the current.

For example, the vent plate 132 includes a vent portion 132a configured to fracture at a pressure condition (e.g., at a preset pressure condition) to discharge gas from inside the can 120 (e.g., inside the secondary battery 100) and break an electric connection between the vent plate 132 and the sub-plate 135. When the CID operates, the connection portion CP, which is the contact portion between the vent plate 132 and the sub-plate 135, may be separated as the vent portion 132a breaks, and as a result, the electrode assembly 110 and the cap plate 131 may be electrically disconnected (e.g., may be electrically isolated from each other).

Referring to FIG. 3, the vent portion 132a protrudes from the vent plate 132 toward the can 120 (e.g., toward the electrode assembly 110). In addition, a notch 132b is formed around the vent portion 132a to guide and/or facilitate the fracture of the vent portion 132a. If the internal pressure of the can 120 increases due to gas generated in the can 120, the fracture may first occur at the notch 132b, and then, the gas may be discharged through the ventilation openings 131b, thereby preventing explosion of the secondary battery 100.

The sub-plate 135 is positioned under the vent plate 132 and faces the vent plate 132 with the insulator 133 and the middle plate 134 being disposed therebetween. The sub-plate 135 is electrically connected to the vent portion 132a through the connection portion CP.

The middle plate 134 is positioned under the insulator 133, and penetration openings 133a and 134a (e.g., penetration holes) are respectively formed in the insulator 133 and the middle plate 134. Thus, the vent portion 132a protrudes into (e.g., farther into) the can 120 through the penetration openings 133a and 134a to be connected to the sub-plate 135.

The middle plate 134 is electrically connected to the vent plate 132 through the sub-plate 135, and the vent portion 132a and the middle plate 134 are connected to (e.g., electrically connected to) the positive current collecting plate 111c through a connection member 136. Thus, the positive current collecting plate 111c is electrically connected to the cap plate 131 through the connection member 136, the middle plate 134, the sub-plate 135, the vent portion 132a, and the vent plate 132.

The cap assembly 130 is inserted into the can 120 and then fixed to the can 120 by clamping. To fix the cap assembly 130 into the can 120, a clamping portion 121 bent into the can 120 is formed on an edge of the opening of the can 120, and a beaded portion 122 having an inwardly convex shape is formed on the can 120 between the cap assembly 130 and the electrode assembly 110. The clamping portion 121 pushes the cap assembly 130 (e.g., pushes the cap assembly 130 toward the electrode assembly 110), and thus, a coupling strength between the cap assembly 130 and the can 120 is improved. The inner diameter of the beaded portion 122 is smaller than the outer diameter of the cap assembly 130, and thus, the electrode assembly 110 may be fixedly positioned in the can 120.

As described above, in the cap assembly 130, the cap plate 131, the vent plate 132, the insulator 133, the middle plate 134, and the sub-plate 135 are sequentially stacked.

The vent plate 132 and the sub-plate 135 substantially form the CID in a state in which the middle plate 134 is disposed between the vent plate 132 and the sub-plate 135, and thus, the insulator 133 disposed between an edge portion of the middle plate 134 and an edge portion of the vent plate 132 may assist with the function of the CID.

For example, if the insulator 133 is deformed and melted due to heat in a short circuit situation, even after the CID operates, the current may flow again.

For example, when the CID operates, the connection portion CP, which is the contact portion between the vent plate 132 and the sub-plate 135, is separated due to the fracture of the vent portion 132a, and thus, the current flowing from the electrode assembly 110 to the cap assembly 130 is interrupted. Thereafter, if the insulator 133 melts due to, for example, abnormal heating, a direct or indirect current passage may be formed between the edge portion of the vent plate 132 and the edge portion of the middle plate 134 that are usually insulated from each other by the insulator 133. In such a state, the current may flow again from the electrode assembly 110 to the cap assembly 130 through the direct or indirect current passage (e.g., from the middle plate 134 to the vent plate 132 while bypassing the vent portion 132a).

Thus, according to embodiments of the present invention, the insulator 133 includes a polymer material having improved heat-resistant characteristics compared to materials used in the related art.

According to an embodiment, the insulator 133 may include a crosslinked polypropylene (PP) resin material. According to another embodiment, the insulator 133 may include a crosslinked polyethylene (PE) resin material.

For example, a crosslinkable PP resin may be injection molded and treated through a water cross-linking process to form the insulator 133 including a crosslinked PP resin structure. Similarly, a crosslinkable PE resin may be injection molded and treated through a water cross-linking process to form the insulator 133 including a crosslinked PE resin structure.

Besides the crosslinkable PP or PE functioning as an insulative material for interrupting the current between the vent plate 132 and the middle plate 134 (e.g., for insulating the vent plate 132 from the middle plate 134), the crosslinkable PP or PE resin may be easily formed into a shape suitable for the assembly and function of the cap assembly 130 through an injection molding process for mass production. In addition, the crosslinkable PP or PE resin may be treated through a cross-linking process as a post-process to improve the heat resistant characteristics of the PP or PE resin.

There may be other materials that have greater heat resistance than the PP or PE resin. However, it may be difficult to perform an injection molding process using such materials as the melting point of such materials may be relatively high. Thus, according to an embodiment, when shaping and mass production of the cap assembly 130 are considered, the insulator 133 may be formed by an injection molding process using a PP or PE resin, and a water cross-linking process may be performed on the insulator 133 as a post-process.

According to an embodiment of the present invention, because the insulator 133 is crosslinked through a water cross-linking process (e.g., a water cross-linking post-process) as described above, the insulator 133 may include an anti-deformation rib 133b (refer to, for example, FIGS. 4A and 4B) to prevent or reduce deformation (e.g., twisting) of the insulator 133 during the water cross-linking process.

Figure 4A:
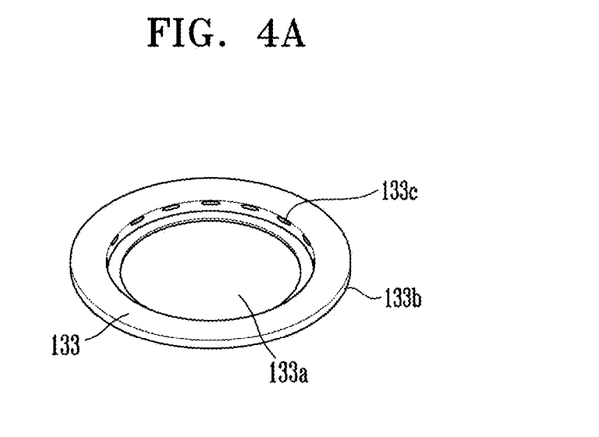
FIG. 4A is a top perspective view of an insulator of the cap assembly shown in FIGS. 1-3.
Figure 4B:
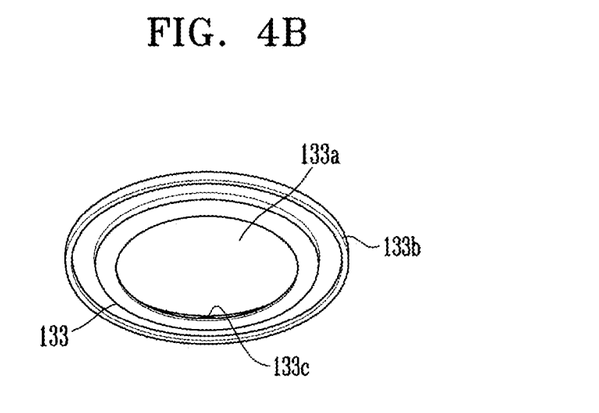
FIG. 4B is a bottom perspective view of the insulator shown in FIG. 4A.
Figure 5:
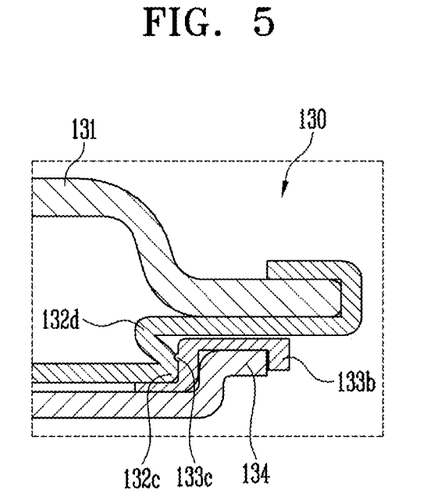
FIG. 5 is an enlarged view of the portion A in FIG. 3.

FIG. 4A is a top perspective view of the insulator 133, FIG. 4B is a bottom perspective view of the insulator 133, and FIG. 5 is an enlarged view of the portion A of FIG. 3.

Referring to FIGS. 4A and 4B, the insulator 133 has a circular ring shape with a central opening 133a. The central opening of the insulator 133 is the above-described penetration opening 133a and provides a space, together with the penetration opening 134a in the middle plate 134, for the vent portion 132a to protrude into the can 120.

In addition, as illustrated in FIGS. 4A and 5, the anti-deformation rib 133b is formed along an outer periphery (e.g., an outer circumferential side) of the circular ring shape of the insulator 133. The anti-deformation rib 133b is a reinforcement rib extending in a direction perpendicular to a surface of the insulator 133 (e.g., the anti-deformation rib 133b extends in a direction such that the anti-deformation rib 133b would stand on a flat surface one which the circular ring shape of the insulator 133 is placed).

In addition, as illustrated in FIGS. 4A and 5, a plurality of protrusions 133c are formed along an inner periphery (e.g., an inner circumference) of the circular ring shape of the insulator 133. The protrusions 133c protrude from an inner side of the circular ring shape of the insulator 133 toward the penetration opening 133a, and thus, the vent plate 132 may be interference fitted into the circular ring shape of the insulator 133 and may not be separated from the insulator 133.

For example, as illustrated in FIG. 5, the vent plate 132 may include a lower bent portion 132c and an upper bent portion 132d that form an S-shaped bent structure, and after the vent plate 132 is coupled to the insulator 133, the protrusions 133c may engage an upper portion (e.g., an upper surface) of the lower bent portion 132c, thereby preventing separation of the vent plate 132 from the insulator 133.

Figure 6:
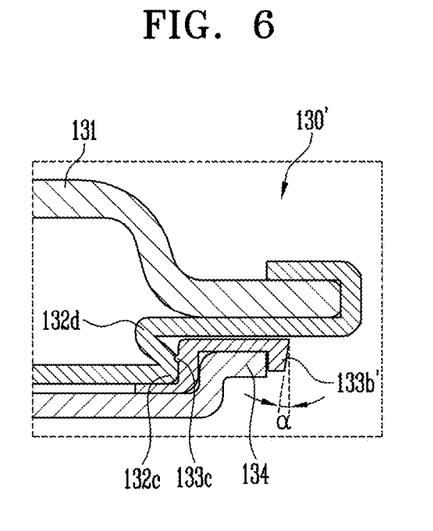
FIG. 6 is a partial cross-sectional view of a cap assembly according to another embodiment of the present invention.

According to another embodiment, as illustrated in FIG. 6, the thickness of an anti-deformation rib 133b' may decrease in a direction away from the circular ring shape of the insulator 133.

For example, the anti-deformation rib 133b' may have an inner side and an outer side, and the outer side of the anti-deformation rib 133b' may form a tapered structure such that the thickness of the anti-deformation rib 133b' may decrease in a direction away from the circular ring shape of the insulator 133. For example, the outer side of the anti-deformation rib 133b' may be tapered at an angle α with respect to a direction normal to the surface of the circular ring shape of the insulator 133 (e.g., from a direction in which the anti-deformation rib 133b' stands on the flat surface on which the circular ring shape of the insulator 133 is placed). In some embodiments, the angle α may be about 5°.

As described above, the insulator 133 is easily formed into a shape suitable for assembly with and the functioning of the cap assembly 130 through an injection molding process for mass production. Thus, because the outer side of the anti-deformation rib 133b' of the insulator 133 has a tapered structure in some embodiments, the insulator 133 may be more easily separated from an injection mold. For example, a worker may easily separate the insulator 133 from an injection mold by lifting an upper portion (i.e., the thickest portion) of the anti-deformation rib 133b' using a pin.

Hereinafter, insulators according to an embodiment of the present invention and a comparative example will be described with reference to FIGS. 7A-9B.

First, according to an exemplary embodiment, an injection-molded part having an insulator shape (e.g., a ring shape) was fabricated by injection molding a PP resin, and then, a water cross-linking process was performed on the injection-molded part by placing the injection-molded part in water together with a crosslinking agent and boiling the water.

The PP resin and the crosslinking agent were, in this example, XPM800HM and PZ010 by Mitsubishi.

If the process temperature of the water cross-linking process is lower than about 70° C., the crosslinking may occur abnormally, and if the process temperature of the water cross-linking process is higher than about 90° C., the insulator shape may be problematic (e.g., the shape of the insulator may change or deform). Therefore, the process temperature of the water cross-linking process may be (e.g., may be adjusted or controlled to be) within a range of about 80° C.±10° C. In the exemplary embodiment, the process temperature of the water during the cross-linking process was 80° C.±about 5° C.

If the process time of the water cross-linking process is shorter than about three hours, there may be problems with the heat resistance of the insulator, and if the process time of the water cross-linking process is longer than about four hours, the productivity of the water cross-linking process may be low. Therefore, the process time of the water cross-linking process may be within (e.g., may be adjusted or controlled to be) a range of about three hours to about four hours. In the exemplary embodiment, the process time of the water cross-linking process was about four hours.

Next, in the comparative example, an injection-molded part having an insulator shape was fabricated using polybutylene terephthalate (PBT).

Figure 7A:
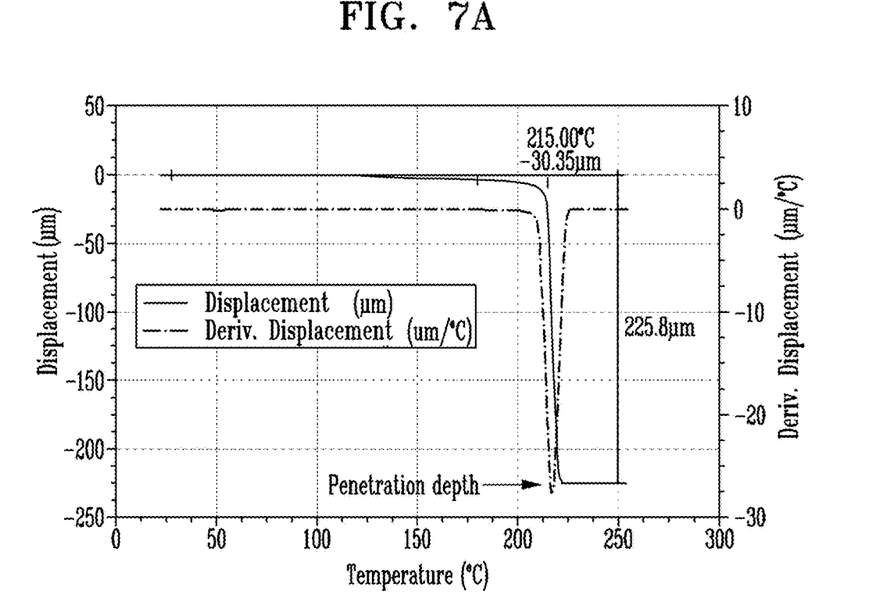
FIG. 7A is a graph illustrating results of a thermomechanical analysis (TMA) of a cap assembly according to a comparative example.
Figure 7B:
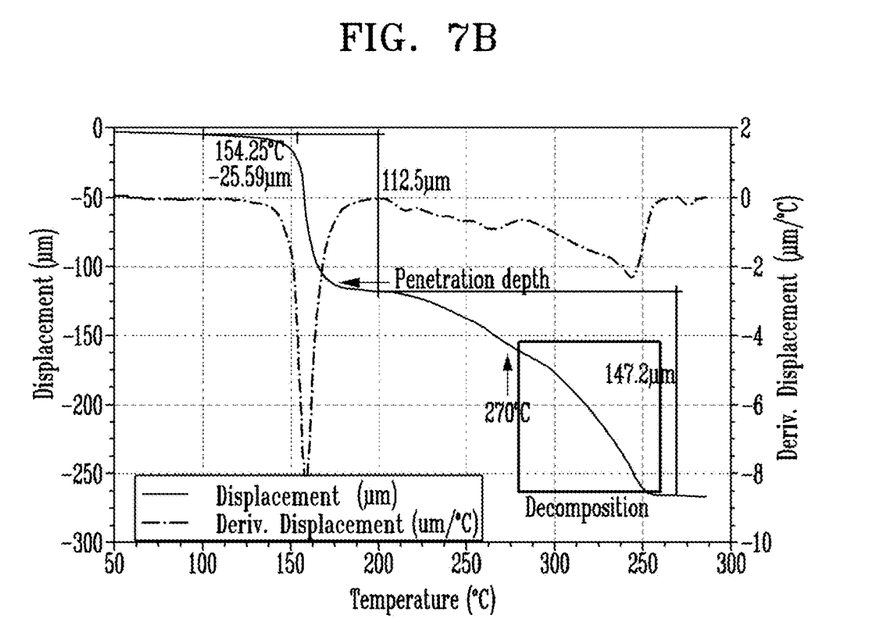
FIG. 7B is a graph illustrating results of a TMA of a cap assembly according to an embodiment of the present invention.
Figure 8A:
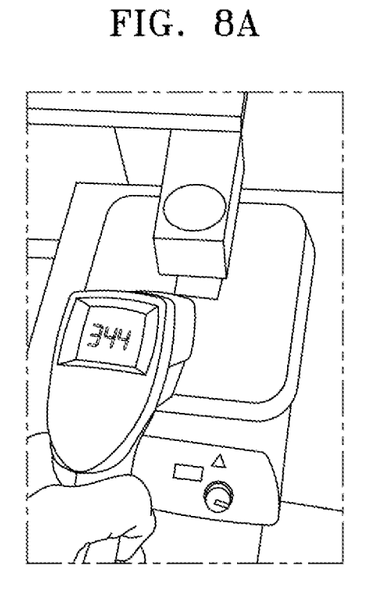
FIGS. 8A-8D sequentially illustrate an insulation test performed under operation conditions of secondary batteries on cap assemblies fabricated according to the comparative example and an embodiment of the present invention.
Figure 8B:
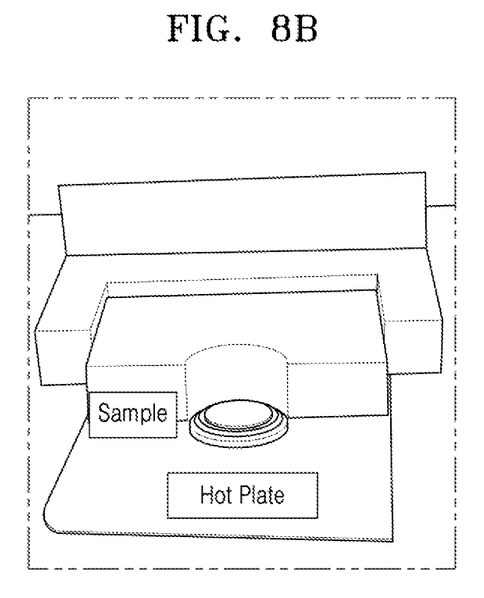
Figure 8C:
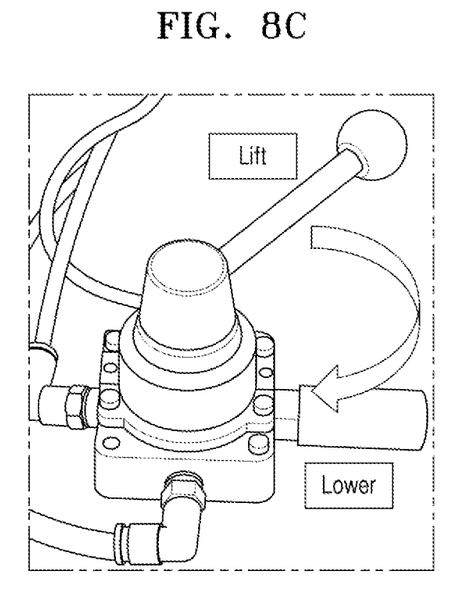
Figure 8D:
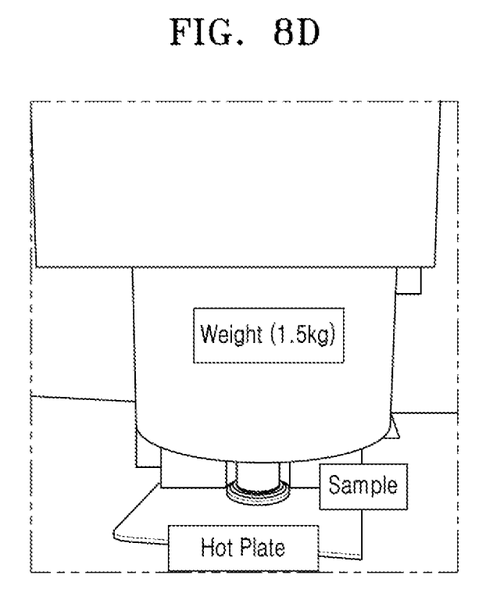

Thermomechanical analysis (TMA) was performed using a probe on the insulators according to the exemplary embodiment and the comparative example. FIG. 7A illustrates the results of the TMA performed on the insulator according to the comparative example, and FIG. 7B illustrates the results of the TMA performed on the insulator according to the exemplary embodiment. In FIGS. 7A and 7B, the left vertical axis refers displacement (μm) of the probe, the horizontal axis refers to temperature (° C.), and the right vertical axis refers to slope (μm/° C.) (e.g., the derivative of the displacement).

As illustrated in FIG. 7A, in the case of the insulator fabricated using PBT, the probe completely penetrated the sample at about 215° C. (i.e., 100% penetration, refer to the penetration depth indicated by the arrow in FIG. 7A). Here, the penetration temperature (i.e., about 215° C.) is the glass transition temperature (Tg) of PBT measured by differential scanning calorimetry (DSC).

As illustrated in FIG. 7B, in the case of the insulator fabricated by an injection molding process using the PP resin and the water cross-linking process according to an embodiment of the present invention, the probe first penetrated the insulator (i.e., about 50% penetration) at about 154° C., which is the glass transition temperature (Tg) of the PP resin measured by DSC (refer to the penetration depth indicated by the arrow in FIG. 7B). Thereafter, thermal decomposition proceeded, and the probe completely penetrated (i.e., 100% penetrated) the insulator at a temperature range of about 270° C. to about 360° C. (refer to the decomposition region indicated by the square in FIG. 7B).

These results of the TMA show that the insulator according to the exemplary embodiment is more useful than the insulator according to the comparative example as an insulator between the vent plate 132 and the middle plate 134 of the cap assembly 130. The temperature of the secondary battery 100 may increase generally up to about 50° C. and even up to about 250° C. due to heat generated during a short circuit test. Thus, after the current is interrupted due to the operation of the CID of the secondary battery 100 in response to, for example, a short circuit, the insulator according to the exemplary embodiment may stably maintain the current interruption state (e.g., may stably maintain electrical isolation between the vent plate 132 and the middle plate 134 of the cap assembly 130) without being melted.

In addition, a cap assembly including the insulator according to an exemplary embodiment of the present invention and a cap assembly including the insulator according to the comparative example were fabricated, and an insulation test was performed on both of the cap assemblies under operation conditions (e.g., under simulated operation conditions) of secondary batteries.

As illustrated in FIGS. 8A-8D, each of the cap assemblies, respectively fabricated using the insulators according to an exemplary embodiment of the present invention and the comparative example, was placed on a hot plate having a temperature of about 350° C. and compressed using a 1.5 kg weight for about 1 minute and 30 seconds. Then, the internal resistance (IR) of each of the cap assemblies was measured. The hot plate having a temperature of about 350° C. provided or simulated conditions similar to abnormal heating conditions of a secondary battery, and the compression by the 1.5 kg weight provided or simulated conditions similar to internal pressure conditions of a secondary battery having gas generated therein.

According to the results of the insulation test, the cap assembly including the insulator according to the comparative example was short circuited, and the cap assembly including the insulator according to an exemplary embodiment of the present invention maintained insulation.

The results of the insulation test show that, when a CID was operated under operation conditions of a secondary battery, the cap assembly according to an exemplary embodiment of the present invention would stably maintain an insulation state in which the current path from an electrode assembly to the cap assembly was interrupted, and the cap assembly according to the comparative example would potentially or likely result in re-flowing of the current.

Figure 9A:
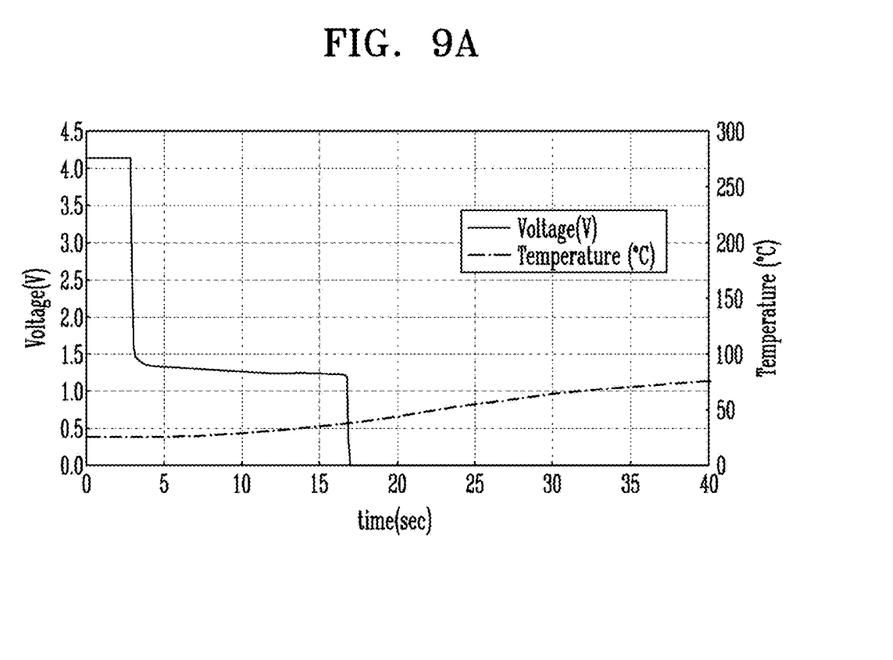
FIG. 9A is a graph illustrating results of an external short circuit test performed on a secondary battery including a cap assembly fabricated according to an embodiment of the present invention.
Figure 9B:
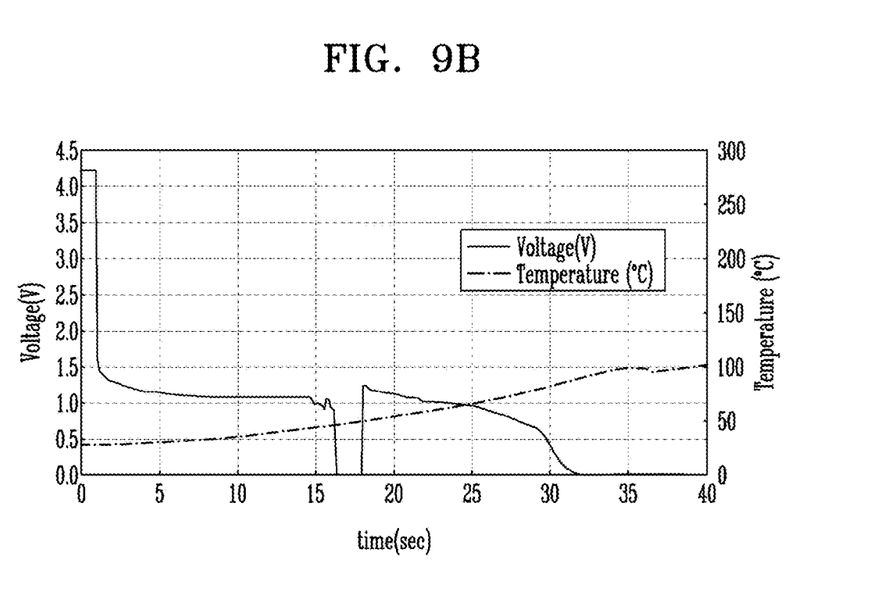
FIG. 9B is a graph illustrating results of an external short circuit test performed on a secondary battery including a cap assembly fabricated according to the comparative example.

In addition, a cap assembly including the insulator according to an exemplary embodiment of the present invention and a cap assembly including the insulator according to the comparative example were fabricated, and an external short circuit test was performed on secondary batteries respectively including the cap assemblies. The external short circuit test was performed by forming a short circuit between positive and negative electrode terminals of each of the secondary batteries in conditions of 25° C. and 10 mΩ (e.g., the short-circuit circuit had a resistance of 10 mΩ). FIG. 9A illustrates the results of the external short circuit test performed on the secondary battery prepared according to an exemplary embodiment of the present invention, and FIG. 9B illustrates the results of the external short circuit test performed on the secondary battery prepared according to the comparative example. In FIGS. 9A and 9B, the left vertical axis refers voltage (V), the horizontal axis refers to time (sec), and the right vertical axis refers to temperature (° C.).

Referring to FIG. 9A, the secondary battery including the cap assembly according to an exemplary embodiment of the present invention had an output voltage of 0 V at about 17 seconds after being externally short circuited under the above-described conditions. For example, a CID of the secondary battery started to operate about 17 seconds after the secondary battery was externally short-circuited under the above-described conditions, and thereafter, the CID stably maintained current interruption. At that time, the temperature of the secondary battery gradually increased without considerable change to the operation of the CID.

Referring to FIG. 9B, although the secondary battery including the cap assembly according to the comparative example had an output voltage of 0 V about 17 seconds after being externally short circuited under the above-described conditions, the output voltage of the secondary battery was restored about 1-2 seconds thereafter and was maintained (e.g., was maintained at a certain value greater than 0 V) until about 32 seconds. The output voltage was restored because the insulator according to the comparative example was deformed and melted by factors, such as heat, during the external short-circuit situation, and thus, the current started to flow again several seconds after the operation of the CID. In addition, due to the re-flow of the current, the temperature of the secondary battery was relatively quickly increased to about 100° C.

As described above, the secondary battery including the cap assembly including the insulator according to an embodiment of the present invention may stably maintain the current interruption state after the CID of the secondary battery is operated due to a situation, such as an overcharged situation.

In other embodiments, the above-mentioned processes may be used when an insulator including a crosslinked PE resin is fabricated. In such embodiments, the above description may be applied and features realized, except for the use of a PE resin instead of a PP resin.

As described above, according to one or more of the above-described exemplary embodiments, even in an abnormal heating situation, such as a battery short-circuit situation, the insulator of the cap assembly may not melt and the cap assembly may stably provide and maintain the function of the CID interrupting current flow from the electrode assembly to the cap assembly.

In addition, according to one or more exemplary embodiments, the insulator of the cap assembly may be formed into a shape suitable for the assembly and functioning of the cap assembly through an injection molding process for mass production. In addition, the heat resistant characteristics of the insulator may be improved through a single post-process, for example, a water cross-linking process and, thus, manufacturing costs may be reduced.

In addition, according to one or more exemplary embodiments, the insulator to be used in the manufacture of the cap assembly may not be deformed during the water cross-linking process and, thus, the fraction of defective cap assemblies may be reduced.

As described above, according to one or more exemplary embodiments, the performance of the CID may remain stable even in a heating situation (e.g., in a high-temperature situation), such as a battery short-circuit situation.

It should be understood that the exemplary embodiments described herein should be considered in a descriptive sense and not for purposes of limitation. Descriptions of features or aspects within each embodiment should typically be considered as available for other similar features or aspects in other embodiments.

While one or more exemplary embodiments of the present invention have been described with reference to the figures, it will be understood by those of ordinary skill in the art that various changes in form and details may be made therein without departing from the spirit and scope as defined by the following claims and their equivalents.

What is claimed is:

1. A cap assembly for a secondary battery, the cap assembly comprising:
   a cap plate;
   a current interrupt device (CID) comprising:
      a vent plate under the cap plate and comprising a vent portion protruding downward, the vent plate being configured to deform in response to an increase in an internal pressure of the secondary battery; and
      a sub-plate under the vent plate and connected to the vent portion;
   a middle plate between the vent plate and the sub-plate and electrically connected to the vent plate via the sub-plate;
   an insulator between the vent plate and the middle plate, the insulator comprising a crosslinked polypropylene (PP) resin or a crosslinked polyethylene (PE) resin and having a circular ring shape having a central opening; and
   an anti-deformation rib extending along an outer periphery of the circular ring shape of the insulator and protruding downward.

2. The cap assembly of claim 1, wherein the anti-deformation rib has a downwardly-decreasing thickness.

3. The cap assembly of claim 2, wherein the anti-deformation rib has an inner side and an outer side, and the outer side of the anti-deformation rib is tapered.

4. The cap assembly of claim 1, wherein the insulator comprises a plurality of protrusions protruding from an inner side of the circular ring shape of the insulator toward a center of the insulator along an inner periphery of the inner side.

5. The cap assembly of claim 4, wherein the vent plate has an S-shaped bent structure comprising a lower bent portion and an upper bent portion, and the vent plate is interference fitted into the circular ring shape of the insulator, and
   wherein the plurality of protrusions engage an upper portion of the lower bent portion to couple the vent plate to the insulator.

6. The cap assembly of claim 1, wherein the middle plate and the insulator each have a penetration opening in center regions thereof, and
   wherein the vent portion is directly connected to a center region of the sub-plate through the penetration opening of the insulator and the penetration opening of the middle plate.

7. A secondary battery comprising:
   a can having an opening;
   an electrode assembly in the can; and
   a cap assembly sealing the opening of the can and electrically connected to the electrode assembly, the cap assembly comprising:
      a cap plate;
      a current interrupt device (CID) comprising:
         a vent plate under the cap plate and comprising a vent portion protruding toward the electrode assembly, the vent plate being configured to deform in response to an increase in an internal pressure of the can; and
         a sub-plate under the vent plate and connected to the vent portion;
      a middle plate between the vent plate and the sub-plate and electrically connected to the vent plate via the sub-plate; and
      an insulator between the vent plate and the middle plate, the insulator comprising a crosslinked polypropylene (PP) resin or a crosslinked polyethylene (PE) resin and having a circular ring shape having a central opening; and
      an anti-deformation rib extending along an outer periphery of the circular ring shape of the insulator and protruding downward.

* * * * *